(12) United States Patent
Barreirinhas et al.

(10) Patent No.: US 9,007,380 B1
(45) Date of Patent: Apr. 14, 2015

(54) ANIMATED 3D BUILDINGS IN VIRTUAL 3D ENVIRONMENTS

(75) Inventors: Quarup Barreirinhas, San Francisco, CA (US); Paul Steven Strauss, Sunnyvale, CA (US); Michael Price, Roslyn Heights, NY (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 13/461,549

(22) Filed: May 1, 2012

(51) Int. Cl.
*G06T 13/00* (2011.01)
*G06T 11/40* (2006.01)

(52) U.S. Cl.
CPC ..................................... *G06T 11/40* (2013.01)

(58) Field of Classification Search
CPC ......... G06T 13/80; G06T 13/00; G06T 13/40; G06T 13/20; G06T 19/20; G06T 11/206
See application file for complete search history.

(56) References Cited

U.S. PATENT DOCUMENTS

| 2008/0186330 A1 | 8/2008 | Pendleton et al. | |
| 2008/0273034 A1* | 11/2008 | Fenney et al. | 345/423 |
| 2011/0106595 A1* | 5/2011 | Vande Velde | 705/14.4 |

OTHER PUBLICATIONS

Google Earth Blog, http://www.youtube.com/watch?v=ThHFKPGoUNY, uploaded on Mar. 21, 2007.*

* cited by examiner

*Primary Examiner* — Kee M Tung
*Assistant Examiner* — Frank Chen
(74) *Attorney, Agent, or Firm* — Dority & Manning, P.A.

(57) ABSTRACT

Systems, methods, and computer storage mediums are provided for animating a static structure rendered in a three-dimensional environment. A method includes accessing mesh data associated with the static structure. The mesh data describes primitives used to render the static structure in the three-dimensional environment. Once the mesh data is accessed, the static structure is rendered in the three-dimensional environment such that the mesh data associated with the static structure is used to represent the static structure. Animation data associated with the static structure is also accessed. The animation data includes a transform that includes a motion type and a description of the group of primitives from the mesh data that the motion type is applied to. Once the animation data is accessed, the group of primitives is animated such that the motion type is applied to the group of primitives.

18 Claims, 5 Drawing Sheets

ANIMATED 3D BUILDINGS IN VIRTUAL 3D ENVIRONMENTS

FIELD

The embodiments described herein generally relate to rendering a virtual three-dimensional environment.

BACKGROUND

Geographic information systems allow users to download, view, and interact with geo-referenced data. The geo-referenced data may be provided to a user through a three-dimensional environment displayed on the user's computer system. The user may interact with the geo-referenced data by selecting geographic features, navigating through the three-dimensional environment, or selecting layers or sets of data for display. The geo-referenced data may be stored at a shared geographic database that is accessed by one or more geographic information servers. Layers or sets of data that may be displayed with the three-dimensional environment may be created by the user or provided by a third party.

BRIEF SUMMARY

The embodiments described herein include systems, methods, and computer storage mediums for animating a static structure rendered in a three-dimensional environment. A method includes accessing mesh data associated with the static structure. The mesh data is provided by a geographic information server and describes primitives used to render the static structure in the three-dimensional environment. Once the mesh data is accessed, the static structure is rendered in the three-dimensional environment such that the mesh data associated with the static structure is used to represent the static structure in the three-dimensional environment. The method also determines whether a computer processor that renders the three-dimensional environment is configured to process animation data included with the mesh data provided by the geographic information server. If the computer processor is configured to process animation data, the animation data associated with the static structure is accessed. The animation data includes a transform that includes at least a motion type and a description of the group of primitives from the mesh data that the motion type is applied to. Once the animation data is accessed, the group of primitives are animated such that the motion type is applied to the primitives.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments described herein may be used to animate a static structure rendered in a virtual three-dimensional environment. The following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate example embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

This detailed description is divided into sections. The first section describes an example three-dimensional environment with a structure that is animated according to an embodiment. The second and third sections describe example system and method embodiments, respectively, that may be used to animate a static structure in a three-dimensional environment. The fourth section describes an example computer system that may be used to implement the embodiments described herein.

Example Animation

Figure 1A:
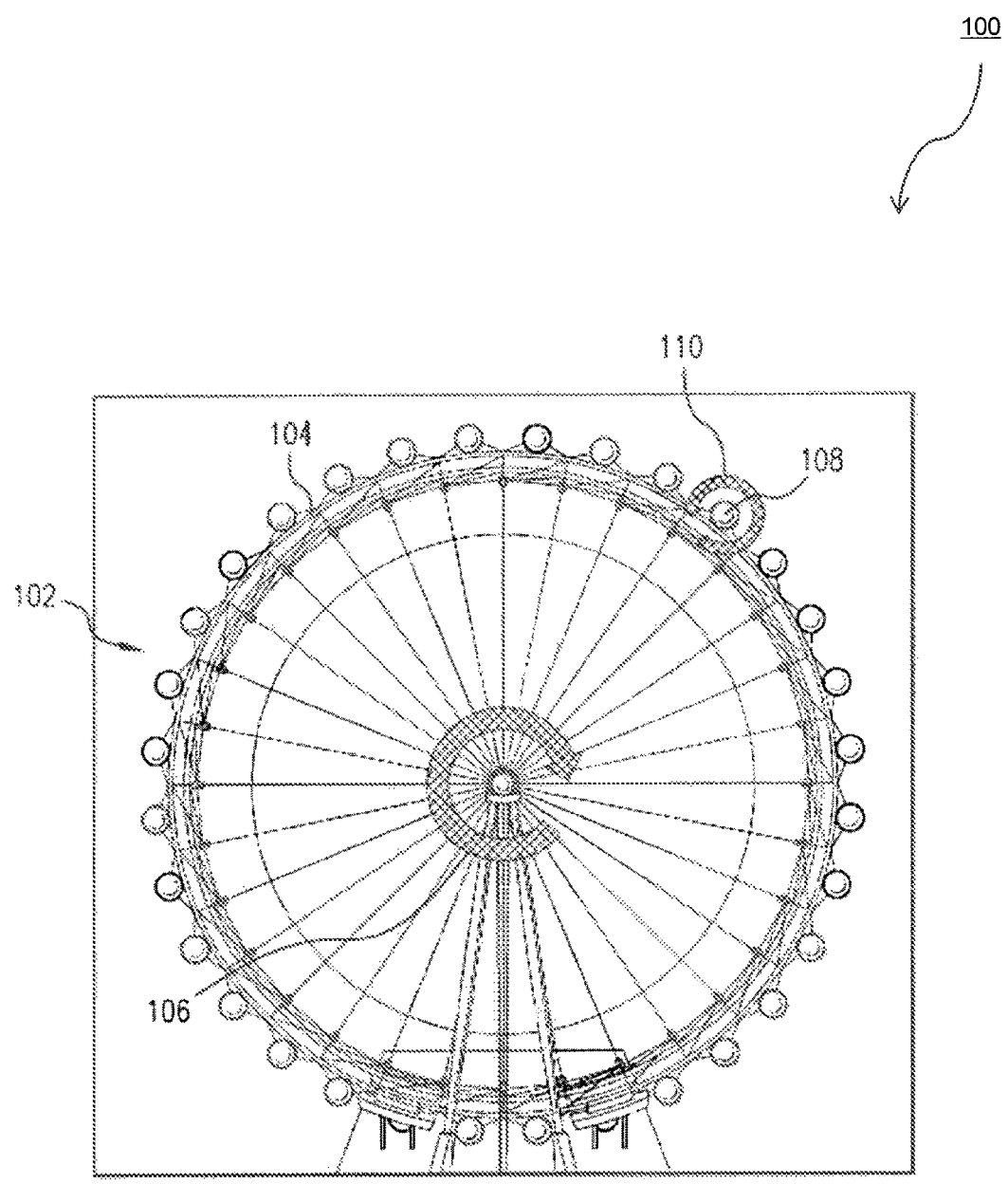
FIG. 1A illustrates a three-dimensional environment with an animated structure that is rendered to display within a viewport.

FIG. 1A illustrates an example three-dimensional environment 102 with an animated structure that is rendered to display within viewport 100. Environment 102 may represent a planetary body such as, for example, the Earth. Geo-referenced data used to render environment 102 may be provided by, for example, a geographic information server. The geo-referenced data may include, among other things, mesh data that is used to render terrain of environment 102 that corresponds to the terrain of the planetary body. The mesh data may also describe one or more static structures that correspond to structures that exist on the planetary body. The position of each static structure rendered in environment 102 may correspond to the geolocation of its corresponding structure on the planetary body. The geo-referenced data may also include animation data that described how to animate the static structures.

Environment 102 includes Ferris wheel 104, and car 108. Ferris wheel 104 is a static structure that is rendered in environment 102 at a specific position on environment 102's terrain. Ferris wheel 104 is bordered by multiple cars including car 108. Ferris wheel 104 and car 108 may each be animated using the embodiments described herein by processing the animation data included with the mesh data used to render Ferris wheel 104 and car 108. In environment 102, the animation data includes two transforms that each describe a motion type and a group of primitives to which the motion type is applied.

The first transform includes motion type 106 and a description of the group of primitives that make up Ferris wheel 104. Motion type 106 describes a rotation motion about an axis located approximately in the center of Ferris wheel 104's group of primitives. Motion type 106 includes a time value that describes the rate that Ferris wheel 104 is rotated.

The second transform includes motion type 110 and a description of the group of primitives that make up car 108. Motion type 110 describes a rotation motion about an axis located approximately in the center of car 108's group of primitives. Motion type 110, however, rotates the primitives of car 108 in direction opposite to the rotation described by motion type 106. Motion type 108 includes a time value that describes the rate that car 108 is rotated which, in this case, corresponds to the rate that Ferris wheel 104 is rotated.

Figure 1B:
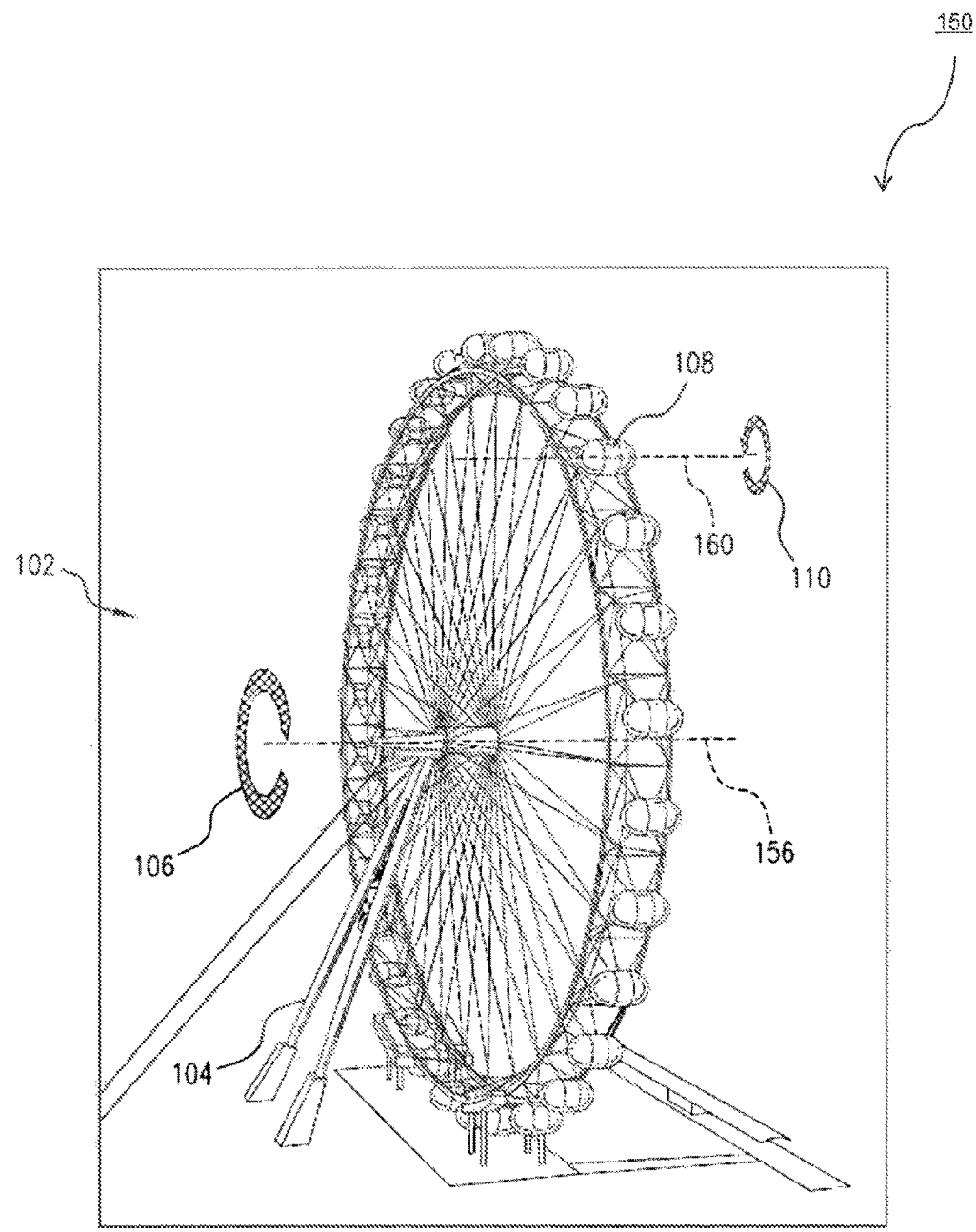
FIG. 1B illustrates the three-dimensional environment of FIG. 1A with a viewport set to view the three-dimensional environment from a different angle.

FIG. 1B illustrates three-dimensional environment 102 of FIG. 1A with viewport 150 set to view environment 102 from a different angle. In viewport 150, the axis described by motion type 106 that is located approximately in the center of Ferris wheel 104 is represented by axis 156 and the axis described by motion type 110 that is located approximately in the center of car 108 is represented by axis 160. Each of axes 156 and 160 may be positioned based on, for example, coordinates associated with motion types 106 and 110, respectively. Alternatively, each of axes 156 and 160 may be positioned automatically to be approximately in the center of the group of primitives associated with motion types 106 and 110, respectively.

FIGS. 1A-B are provided as examples and are not intended to limit the embodiments described herein.

Example System Embodiments

Figure 2:
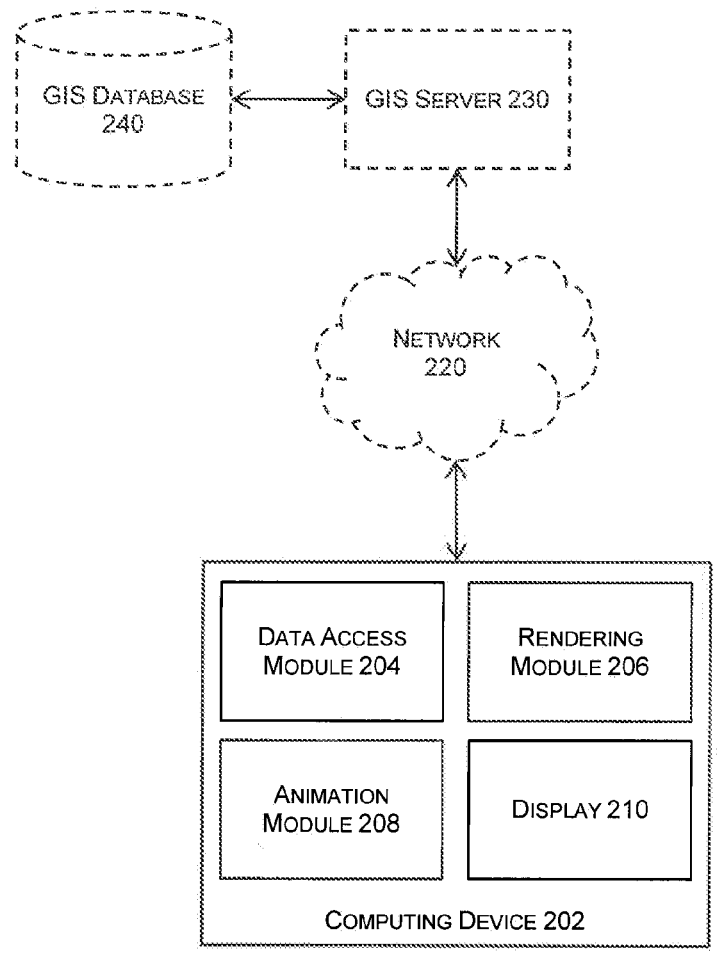
FIG. 2 illustrates an example system that may be used to animate a static structure rendered in a virtual three-dimensional environment according to an embodiment.

FIG. 2 illustrates an example system 200 that may be used to animate a static structure rendered in a virtual three-dimensional environment. System 200 describes a client embodiment but system 200 is not intended to limit alternative embodiments such as, for example, server embodiments. System 200 includes computing device 202, network 220, GIS server 230, and GIS database 240. Client device 202 includes data access module 204, rendering module 206, animation module 208, and display 210. In a server embodiment, animation module 208 may, for example, be included in GIS server 230.

Computing device 202 may be implemented on any computing device capable of rendering a three-dimensional environment. Computing device 202 may include, for example, a mobile computing device (e.g. a mobile phone, a smart phone, a personal digital assistant (PDA), a navigation device, a tablet, or other mobile computing devices). Computing device 202 may also include, but is not limited to, a central processing unit, an application-specific integrated circuit, a computer, workstation, a distributed computing system, a computer cluster, an embedded system, a stand-alone electronic device, a networked device, a rack server, a set-top box, or other type of computer system having at least one processor and memory. A computing process performed by a clustered computing environment or server farm may be carried out across multiple processors located at the same or different locations. Hardware can include, but is not limited to, a processor, memory, and a user interface display.

Some embodiments may optionally include network 220 that may be used to retrieve data from GIS server 230. Network 220 may include any network or combination of networks that can carry data communication. These networks may include, for example, a local area network (LAN) or a wide area network (WAN), such as the Internet. LAN and WAN networks may include any combination of wired (e.g., Ethernet) or wireless (e.g., Wi-Fi, 3G, or 4G) network components.

Some embodiments may also optionally include GIS server 230. GIS server 230 may include any geographic information system capable of serving geo-referenced data. The geo-referenced data may describe features of a planetary body such as, for example, the Earth. The geo-referenced data may include, for example, maps, satellite images, information layers, three-dimensional globes, geographic terrain, navigable paths, structures and buildings, and any other type of geographic data. The geo-referenced data may be served using any number of communication protocols such as, for example, Hypertext Transfer Protocol ("HTTP"), Hypertext Transfer Protocol Secure ("HTTPS"), Web Map Service ("WMS"), Web Map Tile Service ("WMTS"), Web Feature Service ("WFS"), Web Coverage Service ("WCS"), Web Processing Service ("WPS"), or Web Catalog Service ("CWS"). The geo referenced data may be retrieved from a geographic databases such as, for example, GIS database 240. The geographic database may be implemented using a file storage application executed on GIS server 230, a stand-alone database server, or a network of database servers.

GIS server 230 and GIS database 240 may be implemented using a single computer server system or a distributed network of computer server systems. Computer server systems may include computing devices with, for example, one or more central processing units, memory units, and/or application-specific integrated circuits. Examples of computer server systems may include a computer, a workstation, a distributed computing system, a computer cluster, an embedded system, a stand-alone electronic device, a networked device, a rack server, a set-top box, or another type of computer system having at least one processor and memory.

A. Data Access Module

Data access module 204 is configured to access mesh data associated with a static structure. Static structures are representations of structures that exist on a planetary body represented by the three-dimensional environment. The static structures that may be rendered in a three-dimensional environment may include, for example, buildings (e.g., stadiums, rotating towers), water features (e.g., water fountains, waterfalls), theme park rides, modes of transportation (e.g., trains, automobiles, airplanes, boats), or signs (e.g., billboards). Each static structure may be placed in the three-dimensional environment at a position that corresponds to the geolocation of the corresponding structure on the planetary body. In some embodiments, static structures are rendered in a three-dimensional environment as a wire frame or outline. Once the wire frame is determined, a mesh, described by the mesh data, may be wrapped around the wire frame. The mesh data may be provided with the geo-referenced data available from, for example, GIS server 230 or GIS database 240, or may be accessed from a database or data file stored locally at computing device 202.

The mesh used to cover a static structure is comprised of one or more primitives. Primitives that may be used to construct the mesh may include, for example, triangles, squares, or other polygons. Each primitive may be defined by a set of data that may include, for example, coordinates for each vertex, vector data for each ray, or a combination of coordinates and rays. For example, in embodiments where the mesh data consists of triangles, each of the three vertices of a triangle may be described by coordinates that indicate the location of each of the vertices within the mesh. The coordinates may describe two dimensions (e.g., x/y) or three-dimensions (e.g., x/y/z) and may be in an number for formats such as, for example Cartesian, polar, or spherical. Coordinates may also be in a latitude/longitude/altitude format.

Data access module 204 is also configured to determine whether computing device 202 is configured to process animation data. Computing device 202 may be configured to process animation data through, for example, animation module 208, described below. In some embodiments, computing device 202 may not be configured to process animation data. For these embodiments, any animation data received in conjunction with the geo-referenced data may be ignored by computing device 202.

If computing device 202 is configured to process animation data, data access module 204 may also be configured to access animation data that is included with the mesh data and associated with a static structure rendered in the three-dimensional environment. The animation data includes one or more transforms that each identify at least a group of primitives described by the mesh data. The group of primitives may be identified by, for example, an index, an index range, or a set of coordinates. The index or index range may correspond to an index value where data describing the primitives in the mesh data is located. The set of coordinates may correspond to where one or more primitives are located within the mesh. Each transform also includes a motion type and a time value.

The motion type describes how a group of primitives may be animated by indicating the type of motion that may be applied to the group of primitives. Motion types that may be used to animate groups of primitives may include, for example, rotation around an axis, movement along a path, or a change of color or lighting. For example, when a Ferris wheel is rendered in a three-dimensional environment as described in FIGS. 1A-B, several motions types may be provided to animate the wheel. A first motion type may indicate rotation around the wheel's central axis while a second motion type may indicate a counter-rotation for each of the wheel's cars. Motion types may also be included to change the color of the wheel's lights. Other examples of animating static structures may include, for example, animating waterfalls, rivers, trains, automobiles, airplanes, boats, and people using a motion type that indicates movement along a path. Additionally, signs or billboards may be animated by using a motion type that modifies the content of the sign or modifies the border of the billboard.

The time value describes the rate at which a motion type is applied to a group of primitives. The rate may be constant or variable depending on the animation. For example, the Ferris wheel, described above, may include a time value for the motion type that indicates rotation of the wheel about the wheel's central axis. The time value may describe a pattern of motion that accelerates the rotation velocity, holds the rotation velocity constant, decelerates the rotation velocity, and stops the rotation. This pattern of motion may continue while the wheel is within a viewport used to display the three-dimensional environment. The motion type for each of the wheel's cars may include a similar time value that rotates each car in a way that corresponds to the wheel's rotation. In some embodiments, the time value may indicate a constant velocity. In other embodiments, the time value may run a single or pattern of motions for a specified duration. In still other embodiments, the time value may indicate a range of values that may be cycled through or randomly selected.

In some embodiments, the animation data may include multiple groups of primitives. For example, instead of including a transform for each car of the Ferris wheel described in FIGS. 1A-B, the animation data may include one transform that identifies the group of primitives that make up each car. The motion type may then be applied to each car by rotating each car about an axis approximately in the center of each car's group of primitives.

In some embodiments, animation of static structures may not be supported and, as a result, the animation data will be ignored.

B. Rendering Module

Rendering module 206, included in computing device 202, is configured to render a static structure in a three-dimensional environment such that mesh data associated with the static structure is used to represent the static structure in the three-dimensional environment. Rendering module 206 may be implemented in software that is executed by computing device 202 or may be implemented, at least in part, in hardware by, for example, computing device 202's graphic processing unit. In some embodiments, rendering module 206 may also be configured to render other aspects of the three-dimensional environment such as, for example, terrain, navigable paths, layers of visually represented data, or other planetary features.

The static structure may be rendered in the three-dimensional environment using methods known to those of skill in the art. In some embodiments, the static structure is rendered by defining a wire frame that indicates the outline of the structure. Once the wire frame is defined, a mesh is then constructed from one or more primitives described by the mesh data. The mesh is then applied to the wire frame. Other methods for rendering two or three dimensional structure known to those of skill in the art may also be utilized.

Three-dimensional environments rendered at least in part by rendering module 206 may be display at display 210. Display 210 may show an image or a viewport captured by a virtual camera that resides within the three-dimensional environment. The size and/or resolution of the image or viewport may depend on several factors such as, for example, the capabilities of display 210, network 220, or computing device 202. Display device 210 may be implemented using any display or monitor that can display a video signal received from computing device 202. While display 210 is included in computing device 202 in system 200, some embodiments may include display device 202 as a separate component.

C. Animation Module

For embodiments that are configured to process animation data, animation module 208 is configured to animate a group of primitive included in a mesh that is associated with a static structure rendered in the three-dimensional environment. To animate the mesh, a motion type is applied to a group of primitives at a rate described by a time value. For example, to animate the Ferris wheel described in FIG. 1A, animation module 208 may first identify the group of primitives in the mesh that covers the wheel. The group of primitives is provided by a transform associated with the wheel. Once the group of primitives is identified, a motion type indicated by the transform is applied. Here, the motion type for the wheel includes rotating the wheel around its central axis. To apply the rotation, the identified group of primitives that cover the wheel will be continually moved about the wheel's central axis. Thus, the position of each primitive in the mesh that covers the wheel will be modified with each rotation interval.

If the transform includes a time value, the rotation may occur at a rate specified by the time value. For example, the rate may indicate that the primitives be moved 15 degrees every second—thus completing one complete revolution of the wheel every 24 seconds. If the transform does not include a time value, the rotation may continue at a predetermined rate. For example, a predetermined rate may indicate that a rotation occur once a minute. As a result, each primitive in the mesh that makes up the wheel may then be moved such that the wheel rotates six degrees every second.

The time value may also include data indicating a keyframe that describes the interval at which the viewport displaying the three-dimensional environment is refreshed. The keyframe may be used in conjunction with the rate to determine an optimal animation. For example, if the keyframe indicates that the viewport will be refreshed five times every second, the primitives may be rotated three degrees every fifth of one second. Similar determinations may be made for each motion type and rate.

While a rotation animation is described here, other animations may include, for example, moving one or more structures along a path. For example, if a mesh rendered in the three-dimensional environment includes a road, automobiles and/or pedestrians, each may be animated by moving the groups of primitives along the road. To animate the mesh, a transform may be provided that identifies groups of primitives to be moved and a motion type that describes one or more vectors along the road. The groups of primitives may then be moved along at least a portion of a vector at either a predetermined rate or a rate specified by a time value.

Various aspects of embodiments described herein can be implemented by software, firmware, hardware, or a combination thereof. The embodiments, or portions thereof, can also be implemented as computer-readable code. The embodiment in system 200 is not intended to be limiting in any way.

Example Method Embodiments

Figure 3:
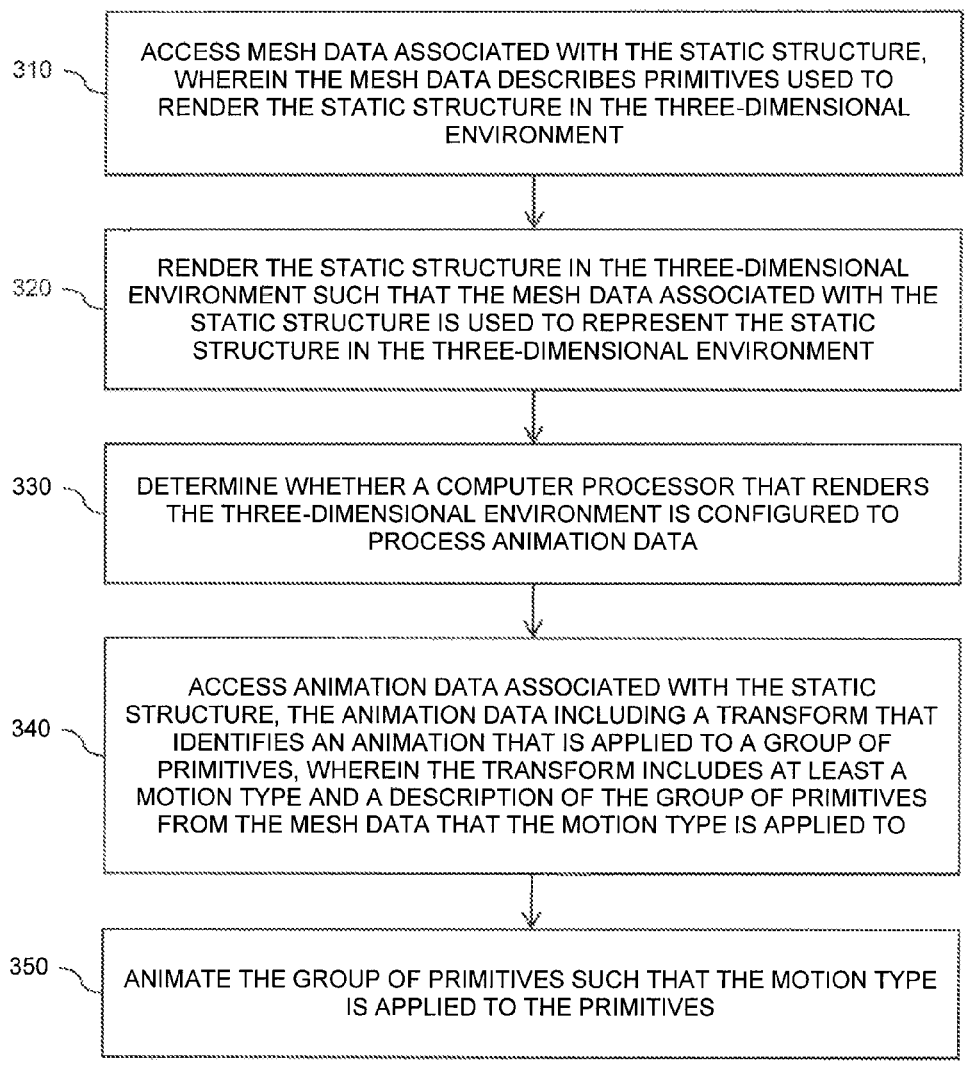
FIG. 3 is a flowchart illustrating an example method for animating a static structure rendered in a virtual three-dimensional environment according to an embodiment.

FIG. 3 is a flowchart illustrating an example method 300 for animating a static structure rendered in a virtual three-dimensional environment according to an embodiment. While method 300 is described with respect to an embodiment, method 300 is not meant to be limiting and may be used in other applications. Additionally, method 300 may be carried out by, for example, system 200 in FIG. 2.

Method 300 accesses mesh data associated with a static structure rendered a three-dimensional environment (stage 310). The mesh data may be provided by a geographic information server along with other data used to render the three-dimensional environment. The mesh data describes primitives used to render the static structure in the three-dimensional environment. The primitives may be arranged in a mesh that covers the static structure. Primitives that may be used in the mesh may include, for example, triangles, squares, rectangles, or other polygons. Each primitive may be described by its position in the mesh through sets of coordinates, sets of vectors, or a combination of coordinates and vectors. The coordinates and/or vectors may describe the primitives in either two or three dimensions. In some embodiments, the mesh data may be included with geo-referenced data retrieved from a geographic information system. Stage 310 may be carried out by, for example, data access module 204 embodied in system 200.

Once mesh data has been accessed, method 300 renders the static structure in the three-dimensional environment such that the mesh data associated with the static structure is used to represent the static structure in the three-dimensional environment (stage 320). In some embodiments, the static structure may be rendered using one or more wire frames to form the structure. The wire frames may then be covered with the mesh of primitives derived from the mesh data. Stage 320 may be carried out by, for example, rendering module 206 embodied in system 200.

Method 300 also determines whether at least one computer processor that renders the three-dimensional environment is configured to process animation data (stage 330). The animation data may be included with the mesh data provided by the geographic information server and may be associated with one or more static structures described by the mesh data. Stage 330 may be carried out by, for example, data access module 204 embodied in system 200.

If at least one computer processor is configured to process animation data, method 300 accesses animation data associated with the static structure (stage 340). The animation data includes a transform that identifies an animation that is applied to a group of primitives. The transform includes at least a motion type and a description of the group of primitives from the mesh data for which the motion type is applied. The motion type may include, for example, a rotation or a motion along a path. For motion types that describe rotations, the motion type may also include a location of a rotation axis. The axis may be indicated by, for example, a set of coordinates or a predefined value that will automatically position the axis based on the group of primitives associated with the motion type. For motion types that describe a motion along a path, the motion type may also include a location of the path or the vectors or coordinates that define the path.

Some embodiments, however, may not be configured to process animation data. In these embodiments, the animation data may be provided in such a way so that the animation data will be ignored or otherwise not processed. This ensures that legacy systems will be able to render three-dimensional environments regardless of the animation data. Stage 340 may be carried out by, for example, data access module 204 embodied in system 200.

If animation data has been accessed, method 300 animates the group of primitives such that the motion type is applied to the primitives (stage 350). The motion type may be applied to the group of primitives by modifying the group of primitives based on the motion type. For example, if the motion type describes a rotation, the group of primitives described by the animation data may be moved about an axis. If the motion type describes motion along a path, the group of primitives may be moved along the path. These motion types are provided as examples and are not intended to limit the embodiments described herein. Stage 350 may be carried out by, for example, animation module 210 embodied in system 200.

Example Computer System

Figure 4:
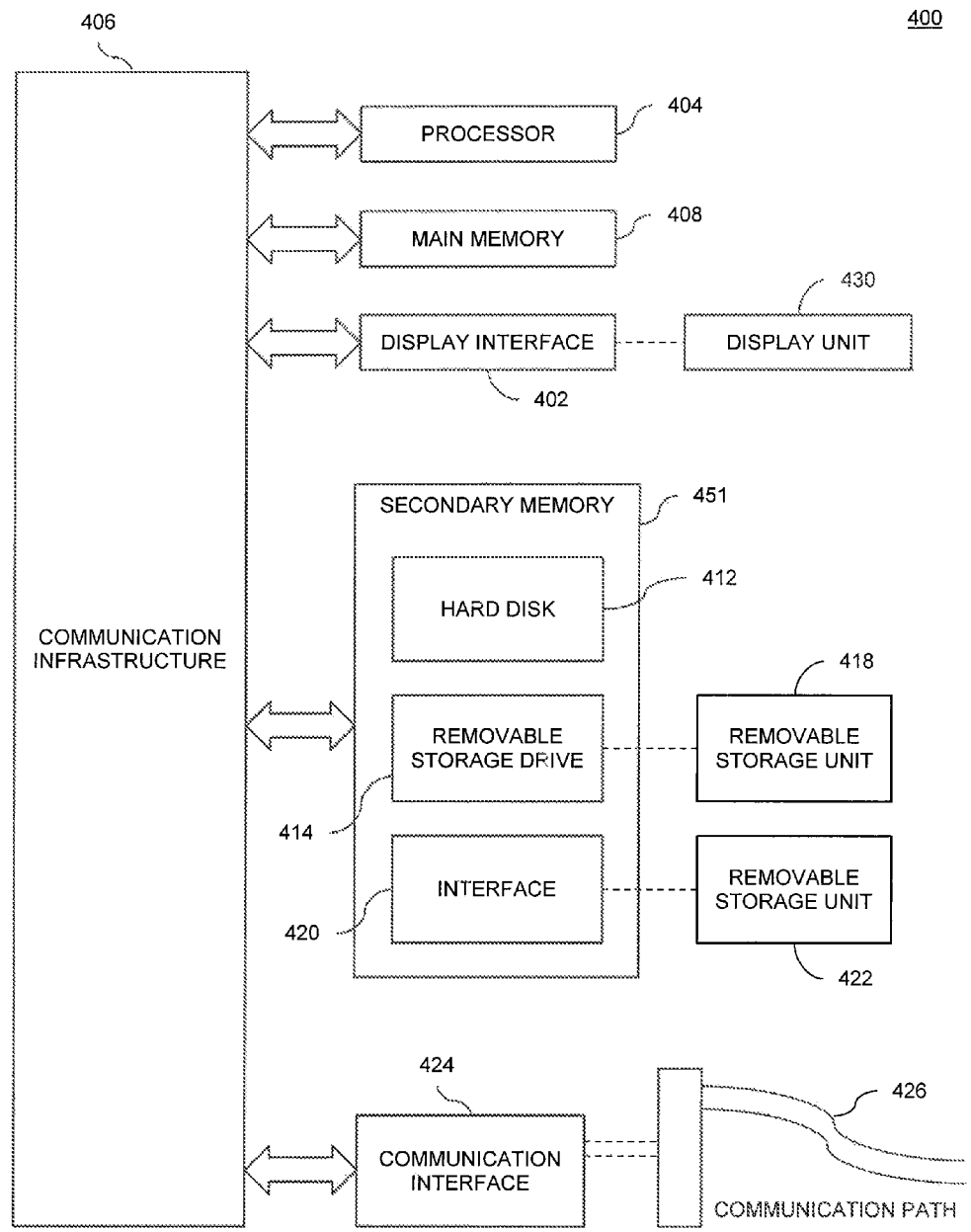
FIG. 4 illustrates an example computer in which the embodiments described herein, or portions thereof, may be implemented as computer-readable code.

FIG. 4 illustrates an example computer system 400 in which embodiments of the present disclosure, or portions thereof, may be implemented. For example, data access module 204, rendering module 206, and animation module 208 may be implemented in computer systems 400 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme. Computer system 400 may also include display interface 402 and touch-screen display unit 430.

Computer system 400 also includes a main memory 408, for example, random access memory (RAM), and may also include a secondary memory 410. Secondary memory 410 may include, for example, a hard disk drive 412, and removable storage drive 414. Removable storage drive 414 may include a floppy disk drive, a magnetic tape drive, an optical disk drive, a flash memory drive, or the like. The removable storage drive 414 reads from and/or writes to a removable storage unit 418 in a well-known manner. Removable storage unit 418 may include a floppy disk, magnetic tape, optical disk, flash memory drive, etc. which is read by and written to by removable storage drive 414. As will be appreciated by persons skilled in the relevant art, removable storage unit 418 includes a computer readable storage medium having stored thereon computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 418, removable storage unit 422, and a hard disk installed in hard disk drive 412. Computer storage medium and computer readable storage medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement the embodiments described herein. In particular, the computer programs, when executed, enable processor device 404 to implement the processes of the embodiments, such as the stages in the methods illustrated by flowchart 300 of FIG. 3, discussed above. Accordingly, such computer programs represent controllers of computer system 400. Where an embodiment is implemented using software, the software may be stored in a computer storage medium and loaded into computer system 400 using removable storage drive 414, interface 420, and hard disk drive 412, or communications interface 424.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

Conclusion

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for animating a static structure rendered in a virtual three-dimensional environment comprising:

accessing, by at least one computer processor, mesh data associated with the static structure, wherein the mesh data describes primitives used to render the static structure in the three-dimensional environment, and wherein the mesh data is provided by a geographic information server;

rendering, by at least one computer processor, the static structure in the three-dimensional environment such that the mesh data associated with the static structure is used to represent the static structure in the three-dimensional environment;

determining, by at least one computer processor, whether the at least one computer processor is configured to process animation data included with the mesh data provided by the geographic information server such that animation data is ignored when it is determined that the at least one processor is not configured to process animation data; and when it is determined that the at least one processor is configured to process animation data;

accessing, by at least one computer processor, animation data associated with the static structure, the animation data including a transform that identifies an animation that is applied to a group of primitives, wherein the transform includes at least a motion type and a description of the group of primitives from the mesh data that the motion type is applied to; and animating, by at least one computer processor, the group of primitives such that the motion type is applied to the primitives.

2. The computer-implemented method of claim 1, wherein the transform includes a time value that describes a rate at which the motion type is applied to the group of primitives; and wherein animating the group of primitives includes applying the motion type to the group of primitives at the rate described by the time value.

3. The computer-implemented method of claim 2, wherein the time value describes a continuous cycle; and wherein animating the group of primitives includes applying the motion type to the group of primitives according to the continuous cycle described by the time value.

4. The computer-implemented method of claim 2, wherein the time value describes a rate pattern, the rate pattern including multiple rates; and wherein animating the group of primitives includes applying the motion type to the group of primitives according to the pattern described by the time value.

5. The computer-implemented method of claim 2, wherein the time value describes a range of rates; and wherein animating the group of primitives includes applying the motion type to the group of primitives at a rate randomly selected from the range of rates described by the time value.

6. The computer-implemented method of claim 2, wherein the animation data includes multiple transforms, and wherein animating the group of primitives includes, for each transform, applying the motion type to the group of primitives at the rate described by the time value.

7. The computer-implemented method of claim 2, wherein the animation data includes multiple groups of primitives, and wherein animating the group of primitives includes applying the motion type to each group of primitives at the rate described by the time value.

8. The computer-implemented method of claim 1, wherein the motion type includes moving the group of primitives along a course in the three-dimensional environment.

9. The computer-implemented method of claim 1, wherein the motion type includes rotating the group of primitives about an axis of the static structure.

10. A computer system for animating a static structure rendered in a virtual three-dimensional environment comprising:

a data access module configured to:
  access mesh data associated with the static structure, wherein the mesh data describes primitives used to render the static structure in the three-dimensional environment, and wherein the mesh data is provided by a geographic information server;
  determine whether the computer system is configured to process animation data included with the mesh data provided by the geographic information server; and
  access animation data associated with the static structure, the animation data including a transform that identifies an animation that is applied to a group of primitives, wherein the transform includes at least a motion type and a description of a group of primitives from the mesh data that the motion type is applied to;

a rendering module configured to render the static structure in the three-dimensional environment such that the mesh data associated with the static structure is used to represent the static structure in the three-dimensional environment;

an animation module configured to ignore animation data when the computer system is not configured to process animation data and to animate the group of primitives such that the motion type is applied to the primitives when the computer system is configured to process animation data;

a memory unit configured to store at least one of the data access module, the rendering module, or the animation module; and a computer processor configured to execute at least one of the data access module, the rendering module, or the animation module.

11. The computer system of claim 10, wherein the transform includes a time value that describes a rate at which the motion type is applied to the group of primitives; and wherein the animation module is further configured to apply the motion type to the group of primitives at the rate described by the time value.

12. The computer system of claim 11, wherein the time value describes a continuous cycle; and wherein the animation module is further configured to apply the motion type to the group of primitives according to the continuous cycle described by the time value.

13. The computer system of claim 11, wherein the time value describes a rate pattern, the rate pattern including multiple rates; and Wherein the animation module is further configured to apply the motion type to the group of primitives according to the pattern described by the time value.

14. The computer system of claim 11, wherein the time value describes a range of rates; and wherein the animation module is further configured to apply the motion type to the group of primitives at a rate randomly selected from the range of rates described by the time value.

15. The computer system of claim 11, wherein the animation data includes multiple transforms, and wherein the animation module is further configured to, for each transform, apply the motion type to the group of primitives at the rate described by the time value.

16. The computer system of claim 11, Wherein the animation data includes multiple groups of primitives, and wherein the animation module is further configured to apply the motion type to each group of primitives at the rate described by the time value.

17. The computer system of claim 10, wherein the motion type includes moving the group of primitives along a course in the three-dimensional environment.

18. The computer system of claim 10, wherein the motion type includes rotating the group of primitives about an axis of the static structure.

* * * * *